(12) United States Patent
Anderson et al.

(10) Patent No.: US 7,664,206 B2
(45) Date of Patent: Feb. 16, 2010

(54) GPS FRONT END HAVING AN INTERFACE WITH REDUCED DATA RATE

(75) Inventors: Erik Anderson, San Francisco, CA (US); Daniel Babitch, San Jose, CA (US); Majid Hashemi, San Jose, CA (US)

(73) Assignee: SiRF Technology, Inc., San Jose, CA (US)

( * ) Notice: Subject to any disclaimer, the term of this patent is extended or adjusted under 35 U.S.C. 154(b) by 525 days.

(21) Appl. No.: 11/192,864

(22) Filed: Jul. 29, 2005

(65) Prior Publication Data

US 2007/0025479 A1  Feb. 1, 2007

(51) Int. Cl.
*H04L 27/06* (2006.01)
(52) U.S. Cl. .................................................... 375/340
(58) Field of Classification Search .................. 375/340
See application file for complete search history.

(56) References Cited

U.S. PATENT DOCUMENTS

| | | | |
|---|---|---|---|
| 6,675,003 | B1 | 1/2004 | Dubash et al. |
| 2005/0104774 | A1 | 5/2005 | Pande |
| 2005/0239451 | A1* | 10/2005 | Periyalwar et al. ........... 455/425 |

FOREIGN PATENT DOCUMENTS

WO    WO 99/13595    3/1999

OTHER PUBLICATIONS

International Search Report for International Application No. PCT/2006/018007.
Written Opinion for International Application No. PCT/US2006/018007.

* cited by examiner

*Primary Examiner*—David C Payne
*Assistant Examiner*—Nader Bolourchi
(74) *Attorney, Agent, or Firm*—Haynes & Boone, LLP.

(57) ABSTRACT

A radio frequency integrated circuit for a global positioning system (GPS) application mixes radio frequency GPS signals from an external source with a predetermined intermediate frequency that is less than $4f_o$. In one embodiment, the intermediate frequency is selected to be $1.5f_o$. An intermediate frequency filter then band-limits the intermediate frequency GPS signals, rolling off at a frequency in the vicinity of 2.5 MHz to achieve substantial attenuation at 3.5-4.0 MHz. An automatic gain control circuit amplifies the filtered intermediate frequency GPS signals to proper voltage levels. The amplified intermediate frequency GPS signals is then digitized by an analog-to-digital converter at a predetermined sampling rate more than twice the intermediate frequency to provide samples of a predetermined number of bits, which are then provided for base band processing by a general purpose microprocessor over an industry-standard serial bus.

21 Claims, 3 Drawing Sheets

GPS FRONT END HAVING AN INTERFACE WITH REDUCED DATA RATE

BACKGROUND OF THE INVENTION

1. Field of the Invnetion

The present invention relates to an interface between a radio frequency (RF) signal processing integrated circuit and a base band processor. In particular, the present invention relates to an interface between an RF signal processing integrated circuit for a global positioning system (GPS) application and a base band processor that is implemented by a general purpose digital signal processor or a general purpose microprocessor of a mobile device.

2. Discussion of the Related Art

A GPS receiver typically includes an RF "front end" integrated circuit (RFIC) and a digital signal processing integrated circuit ("base band processor"). This base band processor is often implemented in an application specific integrated circuit (ASIC) or programmed into one or more field programmable gate arrays (FPGAs). The RF IC receives signals from the GPS satellites through an antenna, down-converts the GPS signals to an intermediate frequency, filters the down-converted signals and digitizes the filtered signal at a prescribed sampling data rate. The RFIC then provides the digitized samples to the base band processor, which "acquires" (i.e., detects) from the digitized samples the signals of one or more GPS satellites ("acquired satellites"). The signals of the acquired satellites are then used to compute the distance ("range") between the receiver and each acquired satellite. The ranges of the acquired satellites may then be used to determine the position of the receiver.

Until recently, the base band processor is often a special purpose integrated circuit specifically designed to be used for the required high speed digital signal processing in GPS applications (e.g., a correlation engine), and may include both hardware and software components. The signal of each GPS satellite is characterized by a unique code vector modulating a carrier signal. In one implementation, the code vector is a 1023-bit pseudorandom noise or code which is repeated every millisecond (i.e., at a "chipping" rate of 1.023 MHz). Conventionally, a common frequency $f_o$=1.023 MHz, which is a common divisor of the two GPS frequencies 1575.42 MHz and 1227.6 MHz, is used as a design parameter for GPS applications. In the prior art, an intermediate frequency of $4f_o$ is typically used, which requires a sampling rate of $16f_o$ to avoid artifacts due to aliasing. Thus, in the prior art, the sampling rate is typically provided at $16f_o$. At a 2-bit or a 3-bit sample resolution (i.e., a sign bit plus one or two magnitude bits per sample), the digitized samples are delivered to the digital signal processing integrated circuit at a bit rate of at least 32-48 megabits per second (Mbs).

Due to this high sample rate required to support successful satellite acquisitions, a general purpose microprocessor or an off-the-shelf (i.e., industry standard) digital signal processor is not used because the simple industry standard serial data interface or interfaces of a general purpose microprocessor do not support the required high date rate of 32-48 Mbs. Even though there are complex high speed data interfaces in such a general purpose processor, these complex interfaces require the RF IC to have significant interface logic resources. Thus, in the prior art, a custom-designed signal processing integrated circuit is preferred as the base-band processor for the GPS signals. Typically, such a custom-designed signal processing integrated circuit uses a special purpose data interface to handle the high data rate continuous data transfers from the RF IC.

SUMMARY

According to one embodiment of the present invention, a radio frequency integrated circuit for a global positioning system (GPS) application mixes radio frequency GPS signals from an external source with a predetermined intermediate frequency that is less than $4f_o$. In one embodiment, an image reject mixer is provided for the mixing operation. The intermediate frequency may be selected to be, for example, $1.5f_o$. An intermediate frequency filter then band-limits the intermediate frequency GPS signals, rolling off at a frequency that is half the expected bandwidth from the intermediate frequency (e.g., in the vicinity of, for example, 3.5 MHz, for a base band GPS signal having a 2 MHz bandwidth). An automatic gain control circuit amplifies the filtered intermediate frequency GPS signals to proper voltage levels. The amplified intermediate frequency GPS signals is then digitized by an analog-to-digital converter at a predetermined sampling rate more than twice the intermediate frequency to provide samples of a predetermined number of bits, which are then provided for base band processing by a general purpose microprocessor over an industry-standard serial bus (e.g., a synchronous peripheral bus).

In one embodiment, the predetermined sampling rate is substantially $6f_o$.

In one embodiment, a calibration circuit is provided to set the pass band of the intermediate frequency filter.

In one embodiment, the product of the predetermined sampling rate and the predetermined number of bits is less than or equal to the data rate of the industry-standard serial bus.

In one embodiment, the predetermined frequency is substantially attenuated at 3.5 MHz, for a 2 MHz bandwidth filter, and substantially attenuated at 4.0 MHz, for a 1 MHz bandwidth filter.

In one embodiment, the radio frequency integrated circuit operates under multiple power-savings states.

The present invention uses a generic or industry standard interface that can be found in a general purpose microprocessor. Such a generic interface requires only a minimal number of pins on both the general purpose microprocessor and the RF integrated circuit.

The present invention is better understood upon consideration of the detailed description below and the accompanying drawings.

BRIEF DESCRIPTION OF THE DRAWINGS

To facilitate cross-referencing between figures, like elements in the figures are provided like reference numerals.

DETAILED DESCRIPTION OF THE PREFERRED EMBODIMENTS

The present invention provides a mobile device that uses a general purpose microprocessor or a digital signal processor to execute a global positioning system (GPS) application, with digitized GPS signals provided from a radio frequency signal processing circuit to the general purpose microprocessor or the digital signal processor over a conventional data interface.

Figure 1:
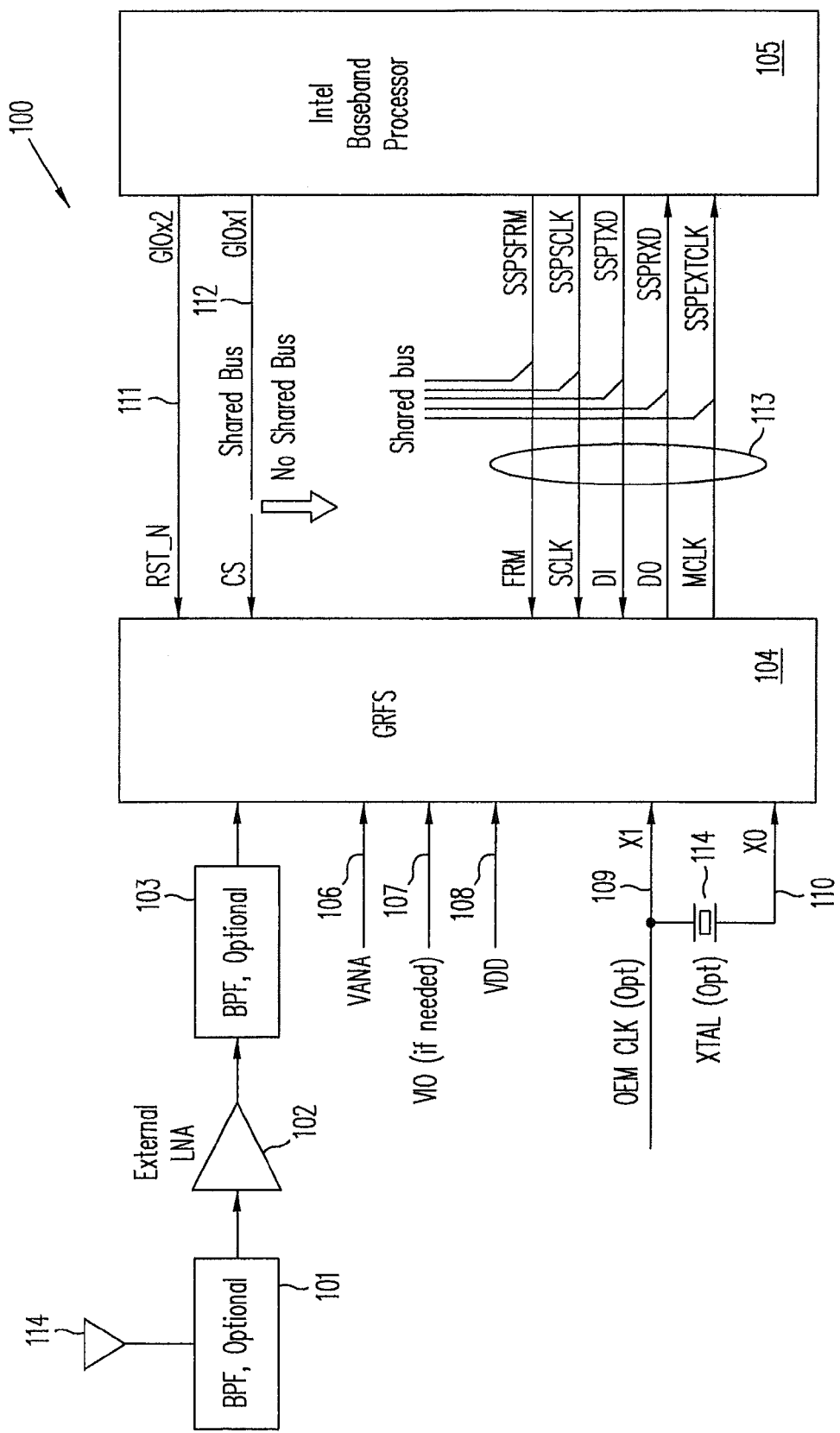
FIG. 1 is a system block diagram of a hardware structure 100 in a mobile device for supporting a GPS application, according to one embodiment of the present invention.

FIG. 1 is a system block diagram of a hardware structure 100 in a mobile device for supporting a GPS application, according to one embodiment of the present invention. As shown in FIG. 1, hardware structure 100 includes (i) optional bandpass filter 101, which receives GPS signals from the satellites through antenna 114, (ii) low noise amplifier (LNA) 102, (iii) optional bandpass filter 103, (iii) radio frequency (RE) "front end" integrated circuit ("RF IC") 104, which downconverts and digitizes the amplified satellite signals, and (iv) base band processor 105, which is implemented by a general purpose microprocessor or a digital signal processor in this embodiment. Base band processor 105 performs digital signal processing for the GPS application. In this embodiment, RF IC 104 receives first power supply voltage ($V_{ana}$) at terminal 106, second power supply voltage ($V_{DD}$) at terminal 108, and input-output power supply voltage ($V_{IO}$) at terminal 107. Voltage $V_{IO}$ is not required if the required voltage levels for input-output are compatible with voltage $V_{DD}$. First and second power supply voltages $V_{ana}$ and $V_{DD}$ are preferably isolated. RF IC 104 may receive, optionally, an external reference clock signal at terminal 109. Alternatively, a clock signal may be provided by external crystal oscillator 114 connected across terminals 109 and 110. External crystal oscillator 114 may be implemented, for example, by a 16.369 MHz ($\approx 16 f_o$) crystal oscillator component.

In this embodiment, general purpose microprocessor 105 may be implemented, for example, by one of the Xscale microprocessors, available from Intel Corporation, Santa Clara, Calif. The Xscale processor is a popular choice for a central processing unit among designers of handheld devices (e.g., cellular phones, PDAs). A conventional serial interface that is available on the Xscale processor is an industry standard synchronous peripheral interface, also denoted as serial peripheral interface (SPI), which is indicated in FIG. 1 by reference numeral 113. SPI has a framing signal (FRM), a clock signal (SCLK) from base band processor 105, a serial data input signal (DI) into RF IC 104 and a serial data output signal (DO) to base band processor 105. For bidirectional operation, a second clock signal (MCLK) may be provided from RF IC 104. In this embodiment, when data is transferred from RF IC 104 to base band processor 105, signal MCLK is provided from RF IC 104 to base band processor 105. Base band processor 105 then derives its output clock signal SCLK from signal MCLK. In this embodiment, base band processor 105 may be programmed to divide the frequency of the MCLK signal by 2 and use the resulting signal as the SCLK signal. In addition, asynchronous reset (RST_N) and "chip-select" (CS) signals are provided from general input-output terminals 111 and 112 of base band processor 105.

RF IC 104 has three operational states: OFF, STANDBY and ON. In the ON state, RF IC 104 is partial bus master of SPI bus 113, providing data and clock signal MCLK to base band processor 105 when base band processor 105 asserts signal CS. In the STANDBY state, base band processor 105 is bus master of SPI bus 113, providing data and signal SCLK to RF IC 104. Base band processor 105 controls the state of RF IC 104 using the reset RST_N signal and software. Base band processor 105 can bring RF IC 104 from either the OFF or the ON state into the STANDBY state by asserting the RST_N signal. In the OFF state, RF IC 104 is in a power-saving state in which a substantial portion of RF IC 104 is powered down.

To transition RF IC 104 from the STANDBY state to the ON state, base band processor 105 writes a command into an internal register of RF IC 104 (which sets a bit "GRFS_ON_EN"), and asserts signal FRM to signal RF IC 104 to transition from a bus slave mode to a partial master mode. Base band processor 105 then transitions to providing signal SCLK from signal MCLK. RF IC 104 transitions to the ON state when base band processor 105 deasserts signal FRM.

To transition RF IC 104 from the STANDBY state to the OFF state, base band processor 150 writes a command into an internal register of RF IC 104, which initiates a power-down sequence in RF IC 104.

Baseband processor 105 can configure RFIC 104 in the STANDBY state over SPI bus 113. Such an arrangement results in a lower number of connections required between RFIC 104 and baseband processor 105.

It is observed that the bandwidth of the base band GPS signal is approximately 2 MHz. To be able to use SPI bus 113, and thus avoid the cost of a customized base band processor, rather than the conventional intermediate frequency of $4f_o$, the intermediate frequency (IF) is selected to be $1.5f_o$, in this embodiment. The $1.5f_o$ intermediate frequency still allows the approximately 2 MHz bandwidth GPS signals. A sampling rate of $6f_o$ can then be selected to avoid aliasing artifacts. Under this arrangement, using a 1-bit or a 2-bit quantization with the sign bit, the resulting sampled signal data can be provided on SPI bus 113 at a data rate of 6 or 12 MHz, respectively.

Another suitable industry standard communication bus that can be used for the present invention is the Multi-Channel Buffered Serial Port ("McBSP") available in the OMAP digital signal processors available from Texas Instruments, Inc. As the signaling conventions under in McBSP are similar to those described above for the SPI bus, the details of an embodiment implemented using the McBSP are omitted.

Figure 2:
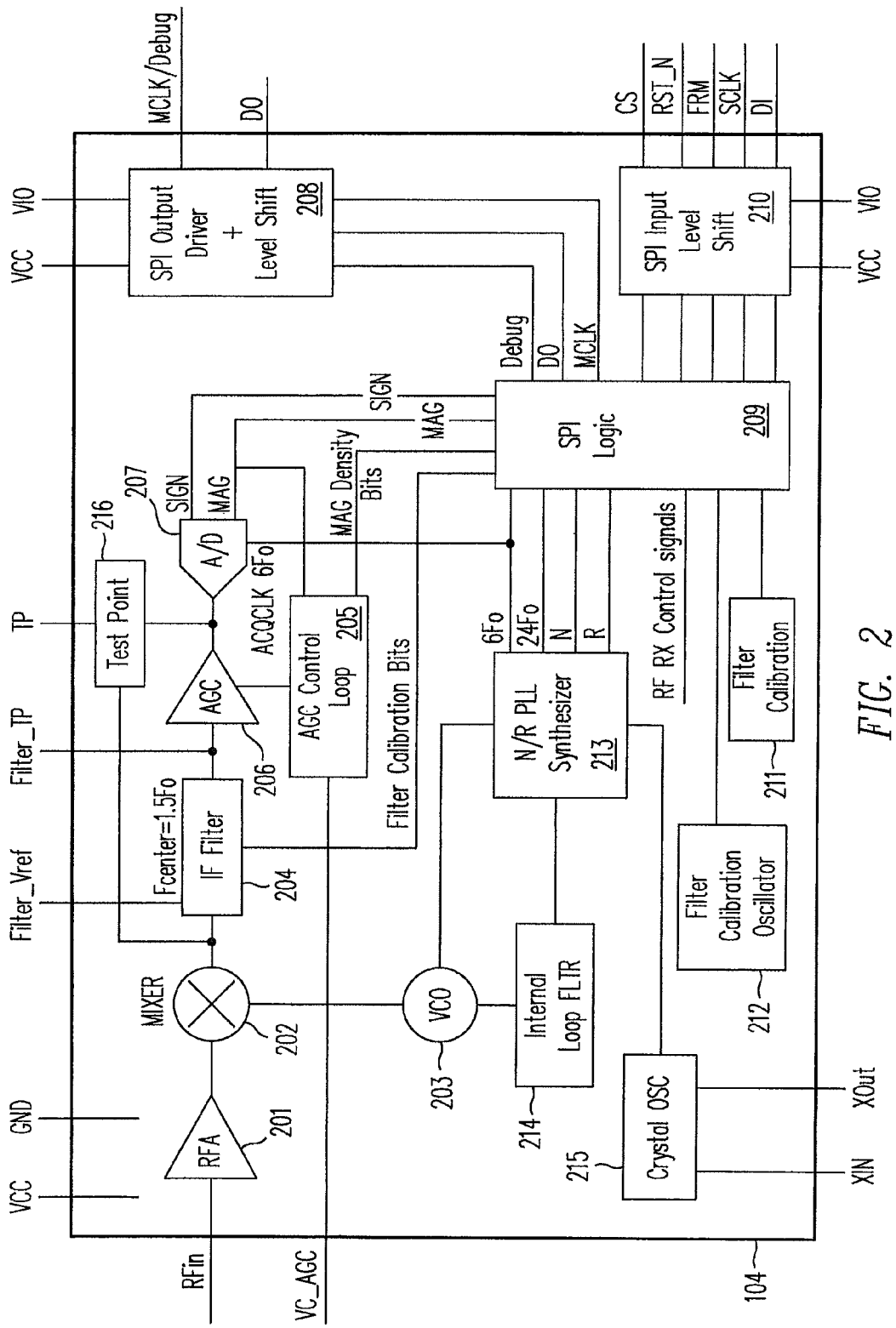
FIG. 2 is a block diagram of RF IC 104, in accordance with one embodiment of the present invention.

FIG. 2 is a block diagram of RF IC 104, in accordance with one embodiment of the present invention. As shown in FIG. 2, RF amplifier 201 amplifies input GPS signals (e.g., from optional band pass filter 103) received into RF 104. The amplified signal is then mixed in an image reject mixer 202 with a signal from voltage-controlled oscillator (VCO) 203 to obtain a base band signal with an intermediate frequency at $1.5f_o$. Image reject mixer 202 may be achieved using quadrature local oscillator input from VCO 203 to achieve image reject at better than 30 dB. VCO 203 is part of a phase-locked loop including a numerical-controlled phase-locked loop synthesizer 213 and internal loop filter 214. N/R phase-locked loop (PLL) synthesizer 213 receives two parameter values: N and R, where N represents the division ratio of the loop, and R represents the division ratio of the reference signal from the crystal oscillator 114, respectively. N/R PLL synthesizer 213 provides a frequency of $6f_o$ for sampling, described below, and a frequency of $24f_o$, which can be used to provide signal MCLK to base band processor 105. Alternatively, a fractional N synthesizer may also be used in place of N/R PLL synthesizer 213 to provide the necessary frequencies.

Figure 3:
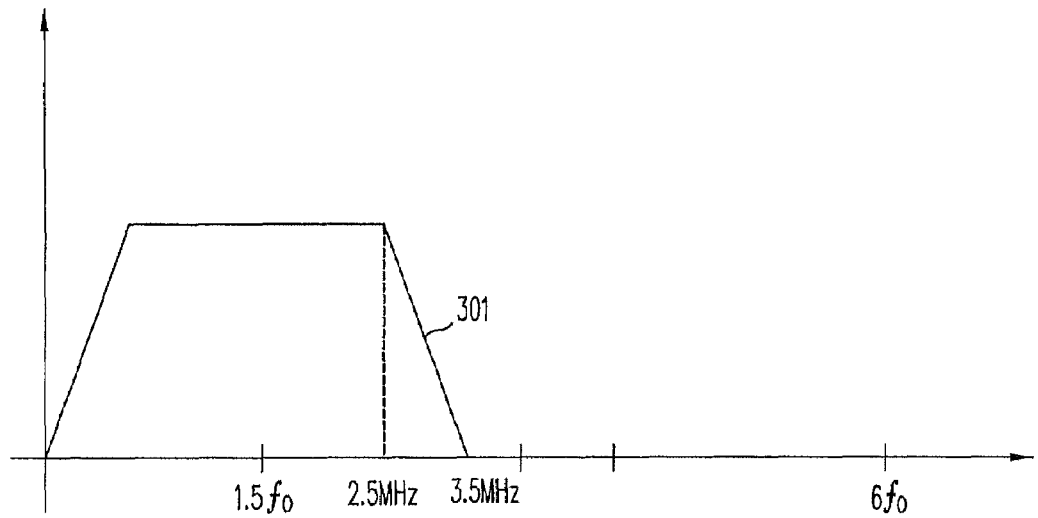
FIG. 3 shows the pass band 301 of IF filter 204, which is substantially attenuate a frequencies in the vicinity of 3.5 MHz, according to one embodiment of the present invention.

The intermediate frequency is then filtered by IF filter 204 with the general shape shown in FIG. 3. The parameters of IF filter 204 include a center frequency at $1.5f_o$, an approximately 2 MHz bandwidth, an upper 3 dB bandwidth of 2.5 MHz, and attenuation at 3.5 MHz for anti aliasing purposes. The filtered signal is then provided to an automatic gain-controlled amplifier (AGC) 206 for an amplification gain of about 50 dB to achieve proper voltage levels for sampling. To ensure that the upper 3 dB bandwidth of IF filter 204 is maintained across process variations, a calibration scheme may be implemented. In particular, test points—which may be accessed at a final testing step in the manufacturing process—are provided at the input and output terminals of IF filter 204, and at the output terminal of AGC 206. The upper 3 db bandwidth is achieved by setting calibration bits over SPI bus 113. The amplified signal from AGC 206 is then provided to analog-digital (A/D) converter 207 to quantize into a magnitude portion and a sign bit. As discussed above, the magnitude portion may be quantized to 1-bit or 2-bit, as desired. In this embodiment, AGC 206 is set by AGC control loop 205 to an operating range which yields a high magnitude bit in A/D converter 206 approximately 40% of the time. (In one implementation, the high magnitude percentage may be made programmable from less than 25% to higher than 50%).

To reduce aliasing noise, in this embodiment, the bandwidths of IF filter 204 may be calibrated. Filter calibration circuit 211 calibrates and sets IF filter 204 using on-chip filter calibration oscillator 212, so that a substantial attenuation is achieved at approximately 3.5 MHz, with a filter bandwidth of approximately 2 MHz, as shown in FIG. 3. Alternatively, with a 1 MHz filter bandwidth, substantial attenuation may be achieved at 4.0 MHz.

The sign and magnitude of the samples are transmitted to base band processor 105 via SPI logic block 209. In this embodiment, the operating voltages of RF IC 104 are between 1.8 volts and 3.0 volts. SPI output driver and level shifter 208 and SPI input level shifter 210 are provided to allow RF IC 104 to interface with the conventional voltage levels of SPI bus 113.

Figure 4:
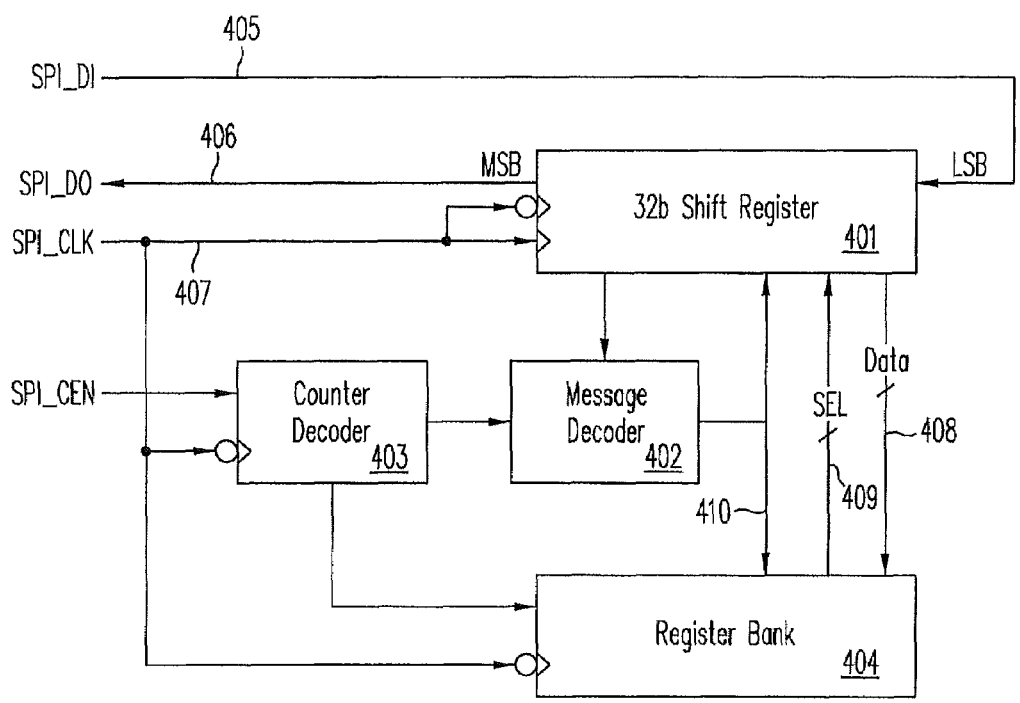
FIG. 4 shows one implementation of SPI control circuit 400 which interfaces RF IC 104 to SPI 113.

FIG. 4 shows one implementation of SPI control circuit 400 which interfaces RF IC 104 to SPI 113. As shown in FIG. 4, logic circuit 400 includes 32-bit shift register 401, which may be loaded in parallel from one of multiple registers of register bank 404 over bus 409. Any of the multiple registers of register bank 404 can also be loaded from 32-bit shift register 401 over bus 408. Counter decoder 403, which is incremented by signal SCLK, generates the address to select one of the multiple registers of register bank 404. During operation, serial data as serial input signal DI at terminal 405 is shifted into 32-bit register 401. At the same time, serial data in 32-bit shift register 401 is shifted out at terminal 406 as serial data signal DO. An 128-bit command from base band processor 104 can be provided and latched into message decoder to control the operation of SPI control circuit 400.

In this embodiment, RF IC includes a terminal TP for selectively accessing the input terminal of IF filter 204 and output terminal of AGC 206.

The above detailed description is provided to illustrate the specific embodiments of the present invention and is not intended to be limiting. Numerous variations and modifications within the scope of the present invention are possible. The present invention is set forth in the following claims.

We claim:

1. A radio frequency integrated circuit for a global positioning system (GPS) application, comprising:
   a mixer which down-converts received GPS signals to a predetermined intermediate frequency that is less than $4f_o$, where $f_o$ is 1.023 MHz, to produce intermediate frequency GPS signals;
   an intermediate frequency filter which receives and filters the intermediate frequency GPS signals to produce filtered intermediate frequency GPS signals;
   an automatic gain control circuit which amplifies the filtered intermediate frequency GPS signals to provide amplified, filtered intermediate frequency GPS signals;
   an analog-to-digital converter which digitizes the amplified, filtered intermediate frequency GPS signals at a predetermined sampling rate to provide samples of a predetermined number of bits; and
   an interface which provides the samples to a base band processor over a shared serial bus, wherein the radio frequency integrated circuit (RFIC) is configurable through the serial bus into: a) an ON state wherein the RFIC controls the serial bus to provide the samples to the base band processor, and b) a STANDBY state wherein the RFIC does not control the serial bus, and wherein the base band processor is a general-purpose microprocessor.

2. A radio frequency integrated circuit as in claim 1, further comprising a calibration circuit for setting the pass band of the intermediate frequency filter.

3. A radio frequency integrated circuit as in claim 1, wherein the mixer comprises an image reject mixer.

4. A radio frequency integrated circuit as in claim 1, wherein a product of the predetermined sampling rate and the predetermined number of bits is less than or equal to a data rate of the serial bus.

5. A radio frequency integrated circuit as in claim 1, wherein the predetermined intermediate frequency is substantially $1.5f_o$.

6. A radio frequency integrated circuit as in claim 5, wherein the predetermined sampling rate is substantially $6f_o$.

7. A radio frequency integrated circuit as in claim 5, wherein the intermediate frequency filter rolls off in the vicinity of 2.5 MHz.

8. A radio frequency integrated circuit as in claim 6, wherein a power spectra of the intermediate frequency filter and the analog-to-digital converter are substantially attenuated at frequencies greater than or equal to 3.5 MHz.

9. A radio frequency integrated circuit as in claim 1, wherein the serial bus comprises a serial peripheral interface (SPI) SPI bus.

10. A radio frequency integrated circuit as in claim 1, wherein the serial bus comprises a Multi-channel Buffered Serial Port bus.

11. A radio frequency integrated circuit as in claim 1, wherein the radio frequency integrated circuit is further configurable into an OFF state through the serial bus.

12. A radio frequency integrated circuit as in claim 1, wherein the baseband processor comprises a digital signal processor.

13. A method for interfacing a radio frequency integrated circuit for a global positioning system (GPS) application with a general purpose microprocessor, comprising:
   receiving radio frequency GPS signals from an external source;
   down-converting the GPS signals in a mixer to a predetermined intermediate frequency that is less than $4f_o$, where $f_o$ is 1.023 MHz, to produce intermediate frequency GPS signals;
   filtering the intermediate frequency GPS signals to produce filtered intermediate frequency GPS signals;
   providing an automatic gain control circuit which amplifies the filtered intermediate frequency GPS signals to produce amplified, filtered intermediate GPS signals;
   digitizing the amplified, filtered intermediate frequency GPS signals at a predetermined sampling rate to provide samples of a predetermined number of bits; and
   providing the samples to the general purpose microprocessor over a shared serial bus, wherein the radio frequency integrated circuit (RFIC) is configurable through the serial bus into: a) an ON state wherein the RFIC controls the serial bus to provide the samples to the base band processor, and b) a STANDBY state wherein the RFIC does not control the serial bus.

14. A method as in claim 13, further comprising calibrating the pass band of the intermediate frequency filter.

15. A method as in claim 13, wherein a product of the predetermined sampling rate and the predetermined number of bits is less than or equal to a data rate of the serial bus.

16. A method as in claim 13, wherein the predetermined intermediate frequency is substantially $1.5f_o$.

17. A method as in claim 16, wherein the predetermined sampling rate is substantially $6f_o$.

18. A method as in claim 13, wherein the serial bus comprises an SPI bus.

19. A method as in claim 13, wherein the serial bus comprises an Multi-channel Buffered Serial Port bus.

20. A method as in claim 13, wherein the general purpose microprocessor comprises a digital signal processor.

21. A method as in claim 13, further comprising configuring the radio frequency integrated circuit over the serial bus into the ON state or the STANDBY state.

* * * * *